(12) United States Patent
Stopler et al.

(10) Patent No.: US 9,191,247 B1
(45) Date of Patent: Nov. 17, 2015

(54) HIGH-PERFORMANCE SEQUENCE ESTIMATION SYSTEM AND METHOD OF OPERATION

(71) Applicant: MagnaCom Ltd., Petach Tikva (IL)

(72) Inventors: Daniel Stopler, Holon (IL); Amir Eliaz, Moshav Ben Shemen (IL)

(73) Assignee: MagnaCom Ltd. (IL)

( * ) Notice: Subject to any disclaimer, the term of this patent is extended or adjusted under 35 U.S.C. 154(b) by 0 days.

(21) Appl. No.: 14/564,187

(22) Filed: Dec. 9, 2014

(51) Int. Cl.
*H04L 27/06* (2006.01)
*H04L 25/03* (2006.01)

(52) U.S. Cl.
CPC ................................ *H04L 25/03197* (2013.01)

(58) Field of Classification Search
CPC ..... G10L 15/14; G10L 15/142; H04L 1/0054; H04L 1/0052; H04L 1/006; H04L 25/03203; H04L 25/03235; H04L 25/03216; H04L 25/03331; H04L 27/3416; H04L 27/3422; G06K 9/6297; H03M 13/39; H03M 13/4169; H03M 13/4192
USPC ......... 375/316, 340, 341, 259, 260, 261, 262, 375/265
See application file for complete search history.

(56) References Cited

U.S. PATENT DOCUMENTS

| | | |
|---|---|---|
| 4,109,101 A | 8/1978 | Mitani |
| 4,135,057 A | 1/1979 | Bayless, Sr. et al. |
| 4,748,626 A * | 5/1988 | Wong ............................ 714/746 |
| 4,797,925 A | 1/1989 | Lin |
| 5,111,484 A | 5/1992 | Karabinis |

(Continued)

FOREIGN PATENT DOCUMENTS

| | | |
|---|---|---|
| WO | 2007/000495 A1 | 1/2007 |
| WO | 2012/092647 A1 | 7/2012 |
| WO | 2013030815 A1 | 3/2013 |

OTHER PUBLICATIONS

"Reduced-State Sequence Estimation with Set Partitioning and Decision Feedback" by Vedat Eyuboglu, published on 1988.*

(Continued)

*Primary Examiner* — Siu Lee
(74) *Attorney, Agent, or Firm* — McAndrews, Held & Malloy, Ltd.

(57) ABSTRACT

An electronic receiver comprises sequence estimation circuitry operable to implement a sequence estimation algorithm. In the sequence estimation algorithm, each of a plurality of possible current states of the signal may have associated with it a respective $N_c$ possible prior states and a respective M state extensions, where $N_c$ and M are integers greater than 1. Each iteration of the sequence estimation algorithm may comprise extending each of the plurality of possible current states of the signal by its respective $N_c$ possible prior states and its respective M state extensions to generate a respective $N_c \times M$ extended states for each of the plurality of possible current states. Each iteration of the sequence estimation algorithm may comprise, for each of the plurality of possible current states of the signal, selecting M of the respective $N_c \times M$ extended states to be state extensions for a next iteration of the sequence estimation algorithm.

19 Claims, 3 Drawing Sheets

(56) References Cited

U.S. PATENT DOCUMENTS

| | | |
|---|---|---|
| 5,131,011 A | 7/1992 | Bergmans et al. |
| 5,202,903 A | 4/1993 | Okanoue |
| 5,249,200 A | 9/1993 | Chen et al. |
| 5,283,813 A | 2/1994 | Shalvi et al. |
| 5,291,516 A | 3/1994 | Dixon et al. |
| 5,394,439 A | 2/1995 | Hemmati |
| 5,432,822 A | 7/1995 | Kaewell, Jr. |
| 5,459,762 A | 10/1995 | Wang et al. |
| 5,590,121 A | 12/1996 | Geigel et al. |
| 5,602,507 A | 2/1997 | Suzuki |
| 5,757,855 A | 5/1998 | Strolle et al. |
| 5,784,415 A | 7/1998 | Chevillat et al. |
| 5,818,653 A | 10/1998 | Park et al. |
| 5,886,748 A | 3/1999 | Lee |
| 5,889,823 A | 3/1999 | Agazzi et al. |
| 5,915,213 A | 6/1999 | Iwatsuki et al. |
| 5,930,309 A | 7/1999 | Knutson et al. |
| 6,009,120 A | 12/1999 | Nobakht |
| 6,151,370 A * | 11/2000 | Wei .................................. 375/341 |
| 6,167,079 A | 12/2000 | Kinnunen et al. |
| 6,233,709 B1 | 5/2001 | Zhang et al. |
| 6,272,173 B1 | 8/2001 | Hatamian |
| 6,335,954 B1 | 1/2002 | Bottomley et al. |
| 6,356,586 B1 | 3/2002 | Krishnamoorthy et al. |
| 6,516,025 B1 | 2/2003 | Warket et al. |
| 6,516,437 B1 | 2/2003 | Van Stralen et al. |
| 6,532,256 B2 | 3/2003 | Miller |
| 6,535,549 B1 | 3/2003 | Scott et al. |
| 6,591,090 B1 | 7/2003 | Vuorio et al. |
| 6,690,754 B1 | 2/2004 | Haratsch et al. |
| 6,697,441 B1 | 2/2004 | Bottomley et al. |
| 6,785,342 B1 | 8/2004 | Isaksen et al. |
| 6,871,208 B1 | 3/2005 | Guo et al. |
| 6,968,021 B1 | 11/2005 | White et al. |
| 6,985,709 B2 | 1/2006 | Perets |
| 7,158,324 B2 | 1/2007 | Stein et al. |
| 7,190,288 B2 | 3/2007 | Robinson et al. |
| 7,190,721 B2 | 3/2007 | Garrett |
| 7,205,798 B1 | 4/2007 | Agarwal et al. |
| 7,206,363 B2 | 4/2007 | Hegde et al. |
| 7,215,716 B1 | 5/2007 | Smith |
| 7,269,205 B2 | 9/2007 | Wang |
| 7,467,338 B2 | 12/2008 | Saul |
| 7,830,854 B1 | 11/2010 | Sarkar et al. |
| 7,974,230 B1 | 7/2011 | Talley et al. |
| 8,005,170 B2 | 8/2011 | Lee et al. |
| 8,059,737 B2 | 11/2011 | Yang |
| 8,175,186 B1 | 5/2012 | Wiss et al. |
| 8,199,804 B1 | 6/2012 | Cheong |
| 8,248,975 B2 | 8/2012 | Fujita et al. |
| 8,351,536 B2 | 1/2013 | Mazet et al. |
| 8,422,589 B2 | 4/2013 | Golitschek Edler Von Elbwart et al. |
| 8,432,987 B2 | 4/2013 | Siti et al. |
| 8,498,591 B1 | 7/2013 | Qian et al. |
| 8,526,523 B1 | 9/2013 | Eliaz |
| 8,548,072 B1 | 10/2013 | Eliaz |
| 8,548,089 B2 | 10/2013 | Agazzi et al. |
| 8,548,097 B1 | 10/2013 | Eliaz |
| 8,553,821 B1 | 10/2013 | Eliaz |
| 8,559,494 B1 | 10/2013 | Eliaz |
| 8,559,496 B1 | 10/2013 | Eliaz |
| 8,559,498 B1 | 10/2013 | Eliaz |
| 8,565,363 B1 | 10/2013 | Eliaz |
| 8,566,687 B1 | 10/2013 | Eliaz |
| 8,571,131 B1 | 10/2013 | Eliaz |
| 8,571,146 B1 | 10/2013 | Eliaz |
| 8,572,458 B1 | 10/2013 | Eliaz |
| 8,582,637 B1 | 11/2013 | Eliaz |
| 8,599,914 B1 | 12/2013 | Eliaz |
| 8,605,832 B1 | 12/2013 | Eliaz |
| 8,665,941 B1 | 3/2014 | Eliaz |
| 8,665,992 B1 | 3/2014 | Eliaz |
| 8,666,000 B2 | 3/2014 | Eliaz |
| 8,675,769 B1 | 3/2014 | Eliaz |
| 8,675,782 B2 | 3/2014 | Eliaz |
| 8,681,889 B2 | 3/2014 | Eliaz |
| 8,731,413 B1 | 5/2014 | Dave et al. |
| 8,737,458 B2 | 5/2014 | Eliaz |
| 8,744,003 B2 | 6/2014 | Eliaz |
| 8,781,008 B2 | 7/2014 | Eliaz |
| 8,804,879 B1 | 8/2014 | Eliaz |
| 8,811,548 B2 | 8/2014 | Eliaz |
| 8,824,572 B2 | 9/2014 | Eliaz |
| 8,824,599 B1 | 9/2014 | Eliaz |
| 8,824,611 B2 | 9/2014 | Eliaz |
| 8,831,124 B2 | 9/2014 | Eliaz |
| 8,842,778 B2 | 9/2014 | Eliaz |
| 8,873,612 B1 | 10/2014 | Eliaz |
| 8,885,698 B2 | 11/2014 | Eliaz |
| 8,885,786 B2 | 11/2014 | Eliaz |
| 8,891,701 B1 | 11/2014 | Eliaz |
| 8,897,387 B1 | 11/2014 | Eliaz |
| 8,897,405 B2 | 11/2014 | Eliaz |
| 8,948,321 B2 | 2/2015 | Eliaz |
| 8,972,836 B2 | 3/2015 | Eliaz |
| 8,976,853 B2 | 3/2015 | Eliaz |
| 8,976,911 B2 | 3/2015 | Eliaz |
| 8,982,984 B2 | 3/2015 | Eliaz |
| 8,989,249 B2 | 3/2015 | Zerbe et al. |
| 9,003,258 B2 | 4/2015 | Eliaz |
| 2001/0008542 A1 | 7/2001 | Wiebke et al. |
| 2002/0016938 A1 | 2/2002 | Starr |
| 2002/0083396 A1* | 6/2002 | Azadet et al. .................. 714/796 |
| 2002/0123318 A1 | 9/2002 | Lagarrigue |
| 2002/0150065 A1 | 10/2002 | Ponnekanti |
| 2002/0150184 A1 | 10/2002 | Hafeez et al. |
| 2002/0172297 A1 | 11/2002 | Ouchi et al. |
| 2003/0016741 A1 | 1/2003 | Sasson et al. |
| 2003/0132814 A1 | 7/2003 | Nyberg |
| 2003/0135809 A1 | 7/2003 | Kim |
| 2003/0210352 A1 | 11/2003 | Fitzsimmons et al. |
| 2004/0009783 A1 | 1/2004 | Miyoshi |
| 2004/0037374 A1 | 2/2004 | Gonikberg |
| 2004/0081259 A1 | 4/2004 | Ammer et al. |
| 2004/0086276 A1 | 5/2004 | Lenosky |
| 2004/0120409 A1 | 6/2004 | Yasotharan et al. |
| 2004/0142666 A1 | 7/2004 | Creigh et al. |
| 2004/0170228 A1 | 9/2004 | Vadde |
| 2004/0174937 A1 | 9/2004 | Ungerboeck |
| 2004/0203458 A1 | 10/2004 | Nigra |
| 2004/0227570 A1 | 11/2004 | Jackson et al. |
| 2004/0240578 A1 | 12/2004 | Thesling |
| 2004/0257955 A1 | 12/2004 | Yamanaka |
| 2005/0032472 A1 | 2/2005 | Jiang et al. |
| 2005/0047517 A1 | 3/2005 | Georgios et al. |
| 2005/0089125 A1 | 4/2005 | Zhidkov |
| 2005/0105658 A1* | 5/2005 | Haratsch ........................ 375/348 |
| 2005/0123077 A1 | 6/2005 | Kim |
| 2005/0135472 A1 | 6/2005 | Higashino |
| 2005/0163252 A1 | 7/2005 | McCallister et al. |
| 2005/0193318 A1 | 9/2005 | Okumura et al. |
| 2005/0220218 A1 | 10/2005 | Jensen et al. |
| 2005/0265470 A1 | 12/2005 | Kishigami et al. |
| 2005/0268210 A1* | 12/2005 | Ashley et al. .................. 714/792 |
| 2005/0276317 A1 | 12/2005 | Jeong et al. |
| 2006/0067396 A1 | 3/2006 | Christensen |
| 2006/0109780 A1 | 5/2006 | Fechtel |
| 2006/0109935 A1 | 5/2006 | McQueen et al. |
| 2006/0171489 A1 | 8/2006 | Ghosh et al. |
| 2006/0203943 A1 | 9/2006 | Scheim et al. |
| 2006/0239339 A1 | 10/2006 | Brown et al. |
| 2006/0245765 A1 | 11/2006 | Elahmadi et al. |
| 2006/0280113 A1 | 12/2006 | Huo |
| 2007/0047121 A1 | 3/2007 | Eleftheriou et al. |
| 2007/0092017 A1 | 4/2007 | Abedi |
| 2007/0098059 A1 | 5/2007 | Ives et al. |
| 2007/0098090 A1 | 5/2007 | Ma et al. |
| 2007/0098116 A1 | 5/2007 | Kim et al. |
| 2007/0110177 A1 | 5/2007 | Molander et al. |
| 2007/0110191 A1 | 5/2007 | Kim et al. |
| 2007/0127608 A1 | 6/2007 | Scheim et al. |
| 2007/0140330 A1 | 6/2007 | Allpress et al. |
| 2007/0189404 A1 | 8/2007 | Baum et al. |

(56) References Cited

U.S. PATENT DOCUMENTS

| | | |
|---|---|---|
| 2007/0213087 A1 | 9/2007 | Laroia et al. |
| 2007/0230593 A1 | 10/2007 | Eliaz et al. |
| 2007/0258517 A1 | 11/2007 | Rollings et al. |
| 2007/0291719 A1 | 12/2007 | Demirhan et al. |
| 2008/0002789 A1 | 1/2008 | Jao et al. |
| 2008/0049598 A1 | 2/2008 | Ma et al. |
| 2008/0080644 A1 | 4/2008 | Batruni |
| 2008/0130716 A1 | 6/2008 | Cho et al. |
| 2008/0130788 A1 | 6/2008 | Copeland |
| 2008/0159377 A1 | 7/2008 | Allpress et al. |
| 2008/0207143 A1 | 8/2008 | Skarby et al. |
| 2008/0260985 A1 | 10/2008 | Shirai et al. |
| 2009/0003425 A1 | 1/2009 | Shen et al. |
| 2009/0028234 A1 | 1/2009 | Zhu |
| 2009/0058521 A1 | 3/2009 | Fernandez |
| 2009/0075590 A1 | 3/2009 | Sahinoglu et al. |
| 2009/0086808 A1 | 4/2009 | Liu et al. |
| 2009/0115513 A1 | 5/2009 | Hongo et al. |
| 2009/0122854 A1 | 5/2009 | Zhu et al. |
| 2009/0137212 A1 | 5/2009 | Belotserkovsky |
| 2009/0185612 A1 | 7/2009 | McKown |
| 2009/0213908 A1 | 8/2009 | Bottomley |
| 2009/0220034 A1 | 9/2009 | Ramprashad et al. |
| 2009/0245226 A1 | 10/2009 | Robinson et al. |
| 2009/0245401 A1 | 10/2009 | Chrabieh et al. |
| 2009/0290620 A1 | 11/2009 | Tzannes et al. |
| 2009/0323841 A1 | 12/2009 | Clerckx et al. |
| 2010/0002692 A1 | 1/2010 | Bims |
| 2010/0034253 A1 | 2/2010 | Cohen |
| 2010/0039100 A1 | 2/2010 | Sun et al. |
| 2010/0062705 A1 | 3/2010 | Rajkotia et al. |
| 2010/0074349 A1 | 3/2010 | Hyllander et al. |
| 2010/0158085 A1 | 6/2010 | Khayrallah |
| 2010/0166050 A1 | 7/2010 | Aue |
| 2010/0172309 A1 | 7/2010 | Forenza et al. |
| 2010/0202505 A1 | 8/2010 | Yu et al. |
| 2010/0202507 A1 | 8/2010 | Allpress et al. |
| 2010/0203854 A1 | 8/2010 | Yu et al. |
| 2010/0208774 A1 | 8/2010 | Guess et al. |
| 2010/0208832 A1 | 8/2010 | Lee et al. |
| 2010/0215107 A1 | 8/2010 | Yang |
| 2010/0220825 A1 | 9/2010 | Dubuc et al. |
| 2010/0266071 A1* | 10/2010 | Chen ............... 375/341 |
| 2010/0278288 A1 | 11/2010 | Panicker et al. |
| 2010/0283540 A1 | 11/2010 | Davies |
| 2010/0284481 A1 | 11/2010 | Murakami et al. |
| 2010/0309796 A1 | 12/2010 | Khayrallah |
| 2010/0329325 A1 | 12/2010 | Mobin et al. |
| 2011/0051864 A1 | 3/2011 | Chalia et al. |
| 2011/0064171 A1 | 3/2011 | Huang et al. |
| 2011/0069791 A1 | 3/2011 | He |
| 2011/0074500 A1 | 3/2011 | Bouillet et al. |
| 2011/0074506 A1 | 3/2011 | Kleider et al. |
| 2011/0075745 A1 | 3/2011 | Kleider et al. |
| 2011/0090986 A1 | 4/2011 | Kwon et al. |
| 2011/0134899 A1 | 6/2011 | Jones, IV et al. |
| 2011/0150064 A1 | 6/2011 | Kim et al. |
| 2011/0164492 A1 | 7/2011 | Ma et al. |
| 2011/0170630 A1 | 7/2011 | Silverman et al. |
| 2011/0182329 A1 | 7/2011 | Wehinger |
| 2011/0188550 A1 | 8/2011 | Wajcer et al. |
| 2011/0228869 A1 | 9/2011 | Barsoum et al. |
| 2011/0243266 A1 | 10/2011 | Roh |
| 2011/0249709 A1 | 10/2011 | Shiue et al. |
| 2011/0275338 A1 | 11/2011 | Seshadri et al. |
| 2011/0310823 A1 | 12/2011 | Nam et al. |
| 2011/0310978 A1 | 12/2011 | Wu et al. |
| 2012/0025909 A1 | 2/2012 | Jo et al. |
| 2012/0027132 A1 | 2/2012 | Rouquette |
| 2012/0051464 A1 | 3/2012 | Kamuf et al. |
| 2012/0106617 A1 | 5/2012 | Jao et al. |
| 2012/0163489 A1 | 6/2012 | Ramakrishnan |
| 2012/0177138 A1 | 7/2012 | Chrabieh et al. |
| 2012/0207248 A1 | 8/2012 | Ahmed et al. |
| 2013/0028299 A1 | 1/2013 | Tsai |
| 2013/0044877 A1 | 2/2013 | Liu et al. |
| 2013/0077563 A1 | 3/2013 | Kim et al. |
| 2013/0121257 A1 | 5/2013 | He et al. |
| 2013/0343480 A1 | 12/2013 | Eliaz |
| 2013/0343487 A1 | 12/2013 | Eliaz |
| 2014/0036986 A1 | 2/2014 | Eliaz |
| 2014/0056387 A1 | 2/2014 | Asahina |
| 2014/0098841 A2 | 4/2014 | Song et al. |
| 2014/0098907 A1 | 4/2014 | Eliaz |
| 2014/0098915 A1 | 4/2014 | Eliaz |
| 2014/0105267 A1 | 4/2014 | Eliaz |
| 2014/0105268 A1 | 4/2014 | Eliaz |
| 2014/0105332 A1 | 4/2014 | Eliaz |
| 2014/0105334 A1 | 4/2014 | Eliaz |
| 2014/0108892 A1 | 4/2014 | Eliaz |
| 2014/0133540 A1 | 5/2014 | Eliaz |
| 2014/0140388 A1 | 5/2014 | Eliaz |
| 2014/0140446 A1 | 5/2014 | Eliaz |
| 2014/0146911 A1 | 5/2014 | Eliaz |
| 2014/0161158 A1 | 6/2014 | Eliaz |
| 2014/0161170 A1 | 6/2014 | Eliaz |
| 2014/0198255 A1 | 7/2014 | Kegasawa |
| 2014/0241477 A1 | 8/2014 | Eliaz |
| 2014/0247904 A1 | 9/2014 | Eliaz |
| 2014/0266459 A1 | 9/2014 | Eliaz |
| 2014/0269861 A1 | 9/2014 | Eliaz |
| 2014/0301507 A1 | 10/2014 | Eliaz |
| 2014/0321525 A1 | 10/2014 | Eliaz |
| 2014/0328428 A1 | 11/2014 | Eliaz |
| 2014/0376358 A1 | 12/2014 | Eder et al. |
| 2015/0010108 A1 | 1/2015 | Eliaz |
| 2015/0043684 A1 | 2/2015 | Eliaz |
| 2015/0049843 A1 | 2/2015 | Reuven et al. |
| 2015/0055722 A1 | 2/2015 | Eliaz |
| 2015/0063499 A1 | 3/2015 | Eliaz |
| 2015/0070089 A1 | 3/2015 | Eliaz |
| 2015/0071389 A1 | 3/2015 | Eliaz |
| 2015/0078491 A1 | 3/2015 | Eliaz |

OTHER PUBLICATIONS

Equalization: The Correction and Analysis of Degraded Signals, White Paper, Agilent Technologies, Ransom Stephens V1.0, Aug. 15, 2005 (12 pages).

Modulation and Coding for Linear Gaussian Channels, G. David Forney, Jr., and Gottfried Ungerboeck, IEEE Transactions of Information Theory, vol. 44, No. 6, Oct. 1998 pp. 2384-2415 (32 pages).

Intuitive Guide to Principles of Communications, www.complextoreal.com, Inter Symbol Interference (ISI) and Root-raised Cosine (RRC) filtering, (2002), pp. 1-23 (23 pages).

Chan, N., "Partial Response Signaling with a Maximum Likelihood Sequence Estimation Receiver" (1980). Open Access Dissertations and Theses. Paper 2855, (123 pages).

The Viterbi Algorithm, Ryan, M.S. and Nudd, G.R., Department of Computer Science, Univ. of Warwick, Coventry, (1993) (17 pages).

R. A. Gibby and J. W. Smith, "Some extensions of Nyquist's telegraph transmission theory," Bell Syst. Tech. J., vol. 44, pp. 1487-1510, Sep. 1965.

J. E. Mazo and H. J. Landau, "On the minimum distance problem for faster-than-Nyquist signaling," IEEE Trans. Inform. Theory, vol. 34, pp. 1420-1427, Nov. 1988.

D. Hajela, "On computing the minimum distance for faster than Nyquist signaling," IEEE Trans. Inform. Theory, vol. 36, pp. 289-295, Mar. 1990.

G. Ungerboeck, "Adaptive maximum-likelihood receiver for carrier modulated data-transmission systems," IEEE Trans. Commun., vol. 22, No. 5, pp. 624-636, May 1974.

G. D. Forney, Jr., "Maximum-likelihood sequence estimation of digital sequences in the presence of intersymbol interference," IEEE Trans. Inform. Theory, vol. 18, No. 2, pp. 363-378, May 1972.

A. Duel-Hallen and C. Heegard, "Delayed decision-feedback sequence estimation," IEEE Trans. Commun., vol. 37, pp. 428-436, May 1989.

M. V. Eyubog•lu and S. U. Qureshi, "Reduced-state sequence estimation with set partitioning and decision feedback," IEEE Trans. Commun., vol. 36, pp. 13-20, Jan. 1988.

(56) References Cited

OTHER PUBLICATIONS

W. H. Gerstacker, F. Obernosterer, R. Meyer, and J. B. Huber, "An efficient method for prefilter computation for reduced-state equalization," Proc. of the 11th IEEE Int. Symp. Personal, Indoor and Mobile Radio Commun. PIMRC, vol. 1, pp. 604-609, London, UK, Sep. 18-21, 2000.
W. H. Gerstacker, F. Obernosterer, R. Meyer, and J. B. Huber, "On prefilter computation for reduced-state equalization," IEEE Trans. Wireless Commun., vol. 1, No. 4, pp. 793-800, Oct. 2002.
Joachim Hagenauer and Peter Hoeher, "A Viterbi algorithm with soft-decision outputs and its applications," in Proc. IEEE Global Telecommunications Conference 1989, Dallas, Texas, pp. 1680-1686, Nov. 1989.
S. Mita, M. Izumita, N. Doi, and Y. Eto, "Automatic equalizer for digital magnetic recording systems" IEEE Trans. Magn., vol. 25, pp. 3672-3674, 1987.
E. Biglieri, E. Chiaberto, G. P. Maccone, and E. Viterbo, "Compensation of nonlinearities in high-density magnetic recording channels," IEEE Trans. Magn., vol. 30, pp. 5079-5086, Nov. 1994.
W. E. Ryan and A. Gutierrez, "Performance of adaptive Volterra equalizers on nonlinear magnetic recording channels," IEEE Trans. Magn., vol. 31, pp. 3054-3056, Nov. 1995.
X. Che, "Nonlinearity measurements and write precompensation studies for a PRML recording channel," IEEE Trans. Magn., vol. 31, pp. 3021-3026, Nov. 1995.
O. E. Agazzi and N. Sheshadri, "On the use of tentative decisions to cancel intersymbol interference and nonlinear distortion (with application to magnetic recording channels)," IEEE Trans. Inform. Theory, vol. 43, pp. 394-408, Mar. 1997.
Miao, George J., Signal Processing for Digital Communications, 2006, Artech House, pp. 375-377.
Xiong, Fuqin. Digital Modulation Techniques, Artech House, 2006, Chapter 9, pp. 447-483.
Faulkner, Michael, "Low-Complex ICI Cancellation for Improving Doppler Performance in OFDM Systems", Center for Telecommunication and Microelectronics, 1-4244-0063-5/06/$2000 (c) 2006 IEEE. (5 pgs).
Stefano Tomasin, et al. "Iterative Interference Cancellation and Channel Estimation for Mobile OFDM", IEEE Transactions on Wireless Communications, vol. 4, No. 1, Jan. 2005, pp. 238-245.
Int'l Search Report and Written Opinion for PCT/IB2013/01866 dated Mar. 21, 2014.
Int'l Search Report and Written Opinion for PCT/IB2013/001923 dated Mar. 21, 2014.
Int'l Search Report and Written Opinion for PCT/IB2013/001878 dated Mar. 21, 2014.
Int'l Search Report and Written Opinion for PCT/IB2013/002383 dated Mar. 21, 2014.
Int'l Search Report and Written Opinion for PCT/IB2013/01860 dated Mar. 21, 2014.
Int'l Search Report and Written Opinion for PCT/IB2013/01970 dated Mar. 27, 2014.
Int'l Search Report and Written Opinion for PCT/IB2013/01930 dated May 15, 2014.
Int'l Search Report and Written Opinion for PCT/IB2013/02081 dated May 22, 2014.
Al-Dhahir, Naofal et al., "MMSE Decision-Feedback Equalizers: Finite-Length Results" IEEE Transactions on Information Theory, vol. 41, No. 4, Jul. 1995.
Cioffi, John M. et al., "MMSE Decision-Feedback Equalizers and Coding—Park I: Equalization Results" IEEE Transactions onCommunications, vol. 43, No. 10, Oct. 1995.
Eyuboglu, M. Vedat et al., "Reduced-State Sequence Estimation with Set Partitioning and Decision Feedback" IEEE Transactions on Communications, vol. 36, No. 1, Jan. 1988.
Khaled M. Gharaibeh, Nonlinear Distortion in Wireless Systems, 2011, John Wiley & Sons, 2nd Edition, chapter 3, pp. 59-81.
Forney, G. David Jr., "Coset Codes—Part I: Introduction and Geometrical Classification" IEEE Transactions on Information Theory, vol. 34, No. 5, Sep. 1988.
Prlja, Adnan et al., "Receivers for Faster-than-Nyquist Signaling with and Without Turbo Equalization", 2008.
Int'l Search Report and Written Opinion for PCT/IB2014/002449 dated Mar. 12, 2015.
Digital predistortion of power amplifiers for wireless applications (Doctoral dissertation, Georgia Institute of Technology). Retrieved from the internet <http://http://202.28.199.34/multim/3126235.pdf> Ding, L. Mar. 31, 2005.
Digital predistortion for power amplifiers using separable functions. Signal Processing, IEEE Transactions on, 58(8), 4121-4130. Retrieved from the internet </http://arxiv.org/ftp/arxiv/papers/1306/1306.0037.pdf> Jiang, H., & Wilford, P.A. Aug. 8, 2010.
Digital predistortion linearization methods for RF power amplifiers. Teknillinen korkeakoulu. Retrieved from the Internet <http://lib.tkk.fi/Diss/2008/isbn9789512295463/isbn9789512295463.pdf> Teikari I. Sep. 30, 2008.
Kayhan, F., et al., Joint Signal-Labeling Optimization for Pragmatic Capacity under Peak-Power Constraint, 978-1-4244-5637, 2010.
Kayhan, F., et al., Constellation Design for Transmission over Nonlinear Satellite Channels, Oct. 5, 2012.
Kayhan, F., et al., Signal and Labeling Optimization for Non-Linear and Phase Noise Channels, Department of Electronics and Telecommunications, Sep. 24, 2012.

\* cited by examiner

HIGH-PERFORMANCE SEQUENCE ESTIMATION SYSTEM AND METHOD OF OPERATION

BACKGROUND

Limitations and disadvantages of conventional methods and systems for electronic communication will become apparent to one of skill in the art, through comparison of such approaches with some aspects of the present method and system set forth in the remainder of this disclosure with reference to the drawings.

BRIEF SUMMARY

Methods and systems are provided for communication system with high tolerance of phase noise and nonlinearity, substantially as illustrated by and/or described in connection with at least one of the figures, as set forth more completely in the claims.

DETAILED DESCRIPTION

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y." As another example, "x, y, and/or z" means any element of the seven-element set $\{(x), (y), (z), (x, y), (x, z), (y, z), (x, y, z)\}$. In other words, "x, y and/or z" means "one or more of x, y and z." As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

A communication system in accordance with an example implementation of this disclosure may use a single-carrier air interface based on faster than Nyquist coded modulation. The signal processing in the system may be tailored for achieving high capacity by handling non-linearity and phase noise. The system may be particularly suitable for cases of high-order transmission constellations (e.g. 1024QAM) where both power amplifier non-linearity and phase noise are significant.

An M-algorithm based reduced state sequence estimation (RSSE) architecture may be used as a near maximum likelihood receiver for such a communication system. The downside with M-algorithm architecture, however, is that it requires sorting multiple survivor hypothesis and therefore has a bottleneck (sorting) that limits achievable speedup by parallelization. An alternative approach to RSSE is the use of the Viterbi algorithm, which is actually a true maximum likelihood solution. However the number of states (order of complexity) of full Viterbi algorithm is $A^{N_h-1}$, where the signaling constellation size is denoted by A and the combination of pulse and channel duration (memory) is denoted by $N_h$. For a communication system in accordance with an example implementation of this disclosure, where A=64 and $N_h$=24, the resulting full Viterbi state count $A^{N_h-1}=64^{23}$ is huge. Such complexity may be reduced through use of a truncated Viterbi algorithm. However, in a communication system in accordance with an example implementation of this disclosure, truncating the Viterbi to memory of $N_f$=6 symbols still results in a huge state count of $A^{N_f-1}=64^5$, which is not commercially feasible for some applications.

A set partitioning scheme (i.e. to divide the received state bits to $N_c$ cosets and into parallel transitions) may be used to further reduce the number of Viterbi algorithm states needed. In one example implementation, per each of the $N_f$-1 symbols corresponding to a Viterbi state, each symbol's in-phase and quadrature LSBs are used to define $n_c$=4 cosets and the symbol's higher bits (in integer mapping) are parallel transitions, thus reducing the state count to $N_c^{N_f-1}=4^5$ which is difficult but feasible for many applications.

The performance of Viterbi algorithm approach is limited due to limited memory (e.g. $N_f$=6 in the example described above). To further improve performance, this approach may be augmented using multiple survivors per Viterbi state. This approach is referred to in this disclosure as the "Hybrid Viterbi M-Algorithm Approach" (or "M-Viterbi," for short). In an example implementation, a communication system uses Viterbi Memory of $N_f$=3 (i.e. $N_c^{N_f-1}=4^2$ Viterbi states), but allows at each Viterbi state multiple (e.g. M=16) survivors paths as used in the M-Algorithm. These Viterbi state extensions are referred to in this disclosure as "tails". Since the number of survivors required at each Viterbi state is lower than the number of survivors required for pure M-Algorithm, the sort bottleneck is resolved (since the M algorithm has to sort all survivors whereas M-Viterbi only has to sort survivors per state). Moreover, comparing at equal complexity, this approach achieves consistently better performance than the Viterbi Algorithm, and more significantly better performance than M-Algorithm at low SNR's (where the M-Algorithm occasionally loses the correct path and therefore is prone to long error events).

An example implementation of a M-Viterbi receiver in accordance with this disclosure may manage non-linearity and phase noise on top of inter-symbol-interference (ISI) due to channel and faster than Nyquist signaling. Faster than Nyquist signaling, with significant spectral compression (i.e. twice the signal BW), may be used to manage non-linearity. Since distortion BW is higher than signal BW, the M-Viterbi RSSE state may be updated at a multiple of original BW.

In a receiver in accordance with an example implementation of this disclosure, the power amplifier output, rather the transmitted symbols (accompanied by some post cursor ISI response), are reconstructed at the output of the FFE. Reconstructing the PA output rather than the transmitted symbols exposes nonlinear distortion and enables compensating for the nonlinear distortion using a maximum likelihood based approach.

In an example receiver in accordance with an implementation of this disclosure, the M-Viterbi Algorithm decodes a double convolution distorted response. That is, original symbols are first convolved by the response of the transmit pulse shaping filter, then non-linearly distorted, and finally convolved by the post cursor of the channel response. In such an implementation, the FFE is used to convert the channel response to a response having a short post cursor portion and having most of its energy at the initial tap. This may, reduce the probability of parallel transition error, and result in there being relatively little energy at symbol times beyond the depth of the Viterbi memory (N0.

In the "Viterbi" approach, the Viterbi RSSE is used to maintain a metric per the state, while in an example implementation using the "M-Viterbi" approach, a metric is maintained per pair of (state, tail). In both cases that metric is subsequently used to select the best sequence of states (i.e. survivor via traceback). The sequence of states by itself corresponds to the sequence of symbol cosets along the selected path. To update the state metric, the M-Viterbi RSSE uses the original state symbol history and carrier phase estimation. The parallel transitions (most significant bits (MSBs)) are determined per Viterbi state based on that particular state symbols history and carrier phase estimation. The state history allows to anticipate the nonlinear distortion (typically dealing with power amplifier non-linearity) while carrier phase estimation allows to anticipate the phase noise.

Figure 1:
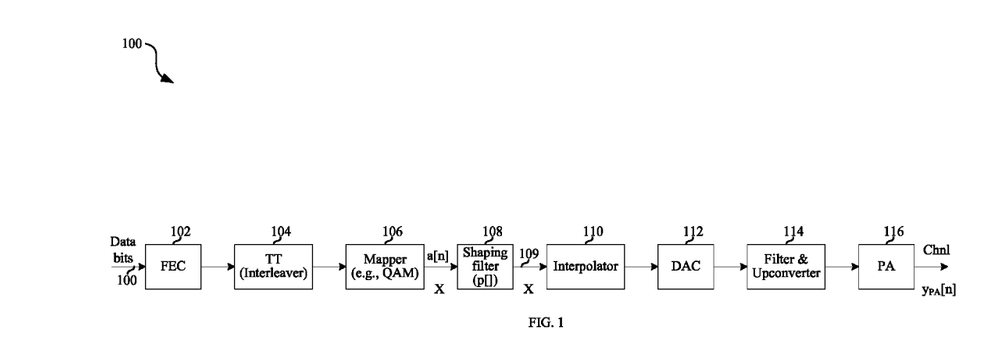
FIG. 1 depicts a transmitter in accordance with an example implementation of this disclosure.

FIG. 1 depicts an example transmitter in accordance with an implementation of this disclosure.

Although the transmitter may use coded modulation, in order to achieve very low BER, it may use an additional outer FEC encoding circuit 102.

In the example transmitter 100, the outer FEC encoder 102 is followed by an interleaver circuit 104 and QAM mapper circuit 106 that outputs symbols denoted as $a_{[n]}$. The QAM mapper 106 operates at faster baud rate than a conventional QAM system using the same bandwidth. In this regard, in an example implementation, if the transmitter 100 is allocated a bandwidth of $W_0$ for transmitting the data 100, then the QAM mapper 106 uses a baud rate (BR)$>W_0$. For comparison, a conventional Nyquist-rate QAM system using the same bandwidth of $W_0$ and having excess bandwidth of $\beta$ would use a baud rate of $W_0/(1+\beta)$. In an example implementation, BR may be double the conventional baud rate (i.e. BR=$2 \cdot W_0/(1+\beta)$). The shaping filter circuit 108, characterized by an expression $p_{[\ ]}$, is run at the baud BR and is used to limit transmitter spectrum according to applicable spectral mask (e.g., specified by a standards and/or regulatory body). In an example implementation the shaping filter 108 bandwidth is lower than baud rate. In an example implementation, the shaping filter 108 is part of modulation code and is designed to optimize coding gain. The output 109 of the shaping filer 108 is interpolated by interpolator circuit 110, converted from digital to analog by digital-to-analog converter (DAC) circuit 112, upconverted to carrier frequency by filter and upconverter circuit 114, and amplified by the PA 116, resulting in signal $y_{PA[n]}$, which is sent over a wireline or wireless channel.

Figure 2:
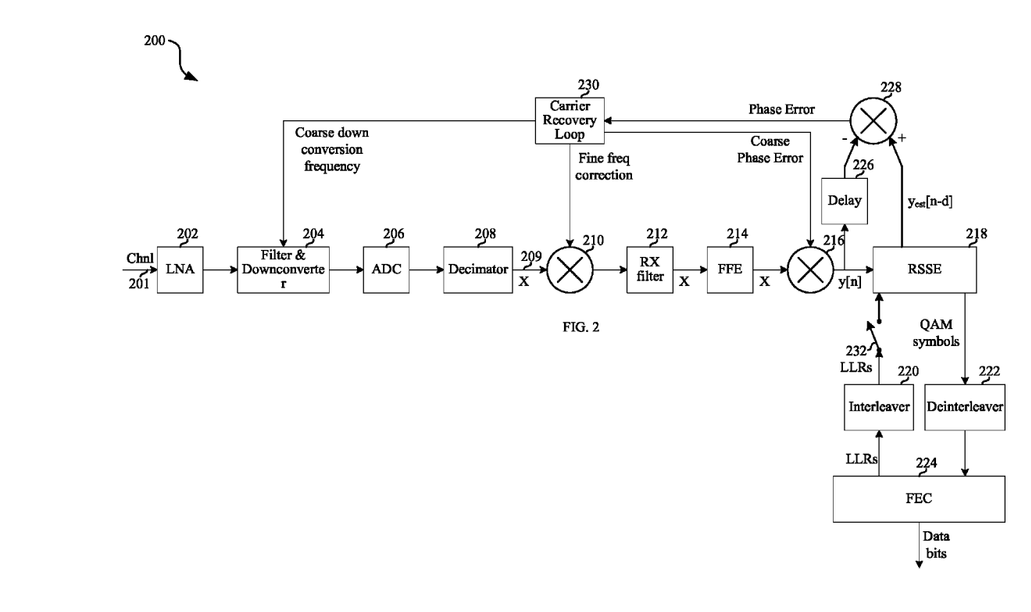
FIG. 2 depicts a receiver in accordance with an example implementation of this disclosure.

FIG. 2 depicts a receiver in accordance with an example implementation of this disclosure. In the receiver 200, the signal 201 (the result of signal $y_{PA[n]}$ passing through the channel) is received by one or more antennas or ports, amplified by an LNA 202, down-converted and filtered by filtering and downconversion circuit 204, sampled by analog-to-digital converter (ADC) circuit 206 and decimated by decimator circuit 208 resulting in signal 209. A carrier recovery loop circuit 230 is used both for driving the downconversion analog phase locked loop (PLL) (frequency conversion) of circuit 204 and a digital fine frequency correction via mixer 210. The carrier recovery loop 230 is fed by a phase error derived by comparing, in circuit 228, the Viterbi/M-Viterbi algorithm delayed input signal $y_{[n-d]}$ from delay element 226 and the Viterbi/M-Viterbi estimated signal $y_{est_{[n-d]}}$ from RSSE circuit 218 (The delay d is to compensate for Viterbi/M-Viterbi processing delay and a short traceback used). In order to quickly track phase changes the traceback used for driving the carrier recovery loop may be smaller than that used for symbol demodulation.

After being rotated by circuit 210 based on the fine frequency correction output by carrier tracking loop 230, the signal 209 is filtered by RX filter circuit 212 and processed by FFE circuit 214 and coarsely phase corrected in circuit 216 resulting in signal $y_{[n]}$ being input to RSSE 218. The objective of the FFE is to recover PA output samples $y_{PA}[n]$ (instead of, or in addition to, recovering transmitted symbols $a_{[n]}$). The FFE 214 may adapt to minimize pre-cursor ISI, while being allowed to produce post cursor ISI. The output of the FFE is fed to the Viterbi/M-Viterbi based RSSE circuit 218 that, at the same time, decodes the modulated signal and manages post cursor ISI, $h_{PC_{[n]}}$, generated by the channel and FFE.

Allowing the FFE 214 to output a signal with post-cursor ISI, $h_{PC[n]}$, where $h_{PC[n]}$ is the residual post cursor channel response not handled by the FFE 214, along with using the Viterbi/M-Viterbi based RSSE circuit 218 to handle the post-cursor ISI may increase complexity of the RSSE 218. Accordingly, in an example implementation where the channel is flat (within determined tolerances) the FFE circuit 214 may be constrained from generating significant post cursor ISI and/or the Viterbi/M-Viterbi-based search algorithm may be configured to expect a pulse that includes the post-cursor ISI. This combined filter is called the composite $h_{[n]}=h_{PC[n]}*p_{[n]}$ (where * denotes convolution).

The output soft-decisions (e.g., log likelihood ratios (LLRs)) of the Viterbi/M-Viterbi-based RSSE circuit 218 are fed to the de-interleaver circuit 222 and outer FEC decoder circuit 224 (for the initial iteration the LLR switch 232 is open, thus inputting zeroes to the RSSE circuit 218). The FEC decoder 224 may output the data bits at this stage. Alternately, to further improve performance, the receiver may perform additional iterations between the RSSE circuit 218 and the outer FEC decoder 224. For these iterations the LLR switch 232 is closed, and the LLR values are converted to extrinsic LLRs by subtracting the respective decoder LLRs input to RSSE circuit 218 from interleaver 220.

The Viterbi/M-Viterbi algorithms have two functions: (1) Equalizing the channel by handling the post cursor ISI; and (2) decoding the received signal. These two tasks may be performed at the same time for the equalizing function to be provided with the decoded decisions. In an example implementation, the receiver 200 may comprise a decision feedback equalizer. In cases of relatively flat/short channel, however, the receiver may disable the DFE (or not have a DFE at all) and may incorporate the DFE into the composite response $h_{[\ ]}$, which is described below.

An MLSE Viterbi algorithm models the set of all possible transmissions using a Hidden Markov Model directed graph that is referred to as the "Trellis". Where the hidden states are the transmitted symbol indices $a_{[n]} \in \{0 \ldots A-1\}$ and the visible information is the conditional expectancy of the received signal denoted here as $y_{est[n]}$ (conditioned on previous and next trellis states). The trellis has a trellis root node and a trellis terminal node, and between them multiple columns of graph nodes. Each column corresponds to a transmission symbol time denoted by n. Graph nodes populating column n correspond to all possible hidden states of the transmission at that symbol time. The set of possible states per column n is called the state space and denoted by the set $s_{[n]}$. Directed graph edges, called branches, exist between two states corresponding to successive columns, between trellis root node and first column, and between last column and trellis terminal node. Every trellis path starting at the trellis root and ending at the trellis terminal node corresponds to a valid transmission, where the set of symbol indices along that path $a_{[n]}$ are mapped to actual symbol $\mu(a_{[n]})$ using the mapping function $\mu(a)$. The branches are indexed here using $I_{br}$, where the root and terminal states of a branch $I_{br}$ are denoted $s_{root}(I_{br})$ and $s_{term}(I_{br})$, and the set of branches starting at a specific state $s_0$ are denoted $B(s_0)$. Every branch $I_{br}$ is labeled by a deterministic value that corresponds to conditional expectancy of the received signal, and based deterministically on $s_{root}(I_{br})$ and $s_{term}(I_{br})$ states. In the MLSE case, the state space corresponds to all $A^{N_t-1}$ sequences of $N_t-1$ last symbol indices that, in conjunction with current symbol index $a_{[n]}$, provide a sufficiently good estimate of received signal $y_{est[n]}$ (i.e. the conditional expectancy). For this to happen $N_t$ must be large enough such that relative tail energy of the channel (including transmission pulse) is low relative to total channel impulse response energy.

Reducing the state space can reduce complexity and memory requirements of a Viterbi decoder. This may be achieved by both reducing $N_t$ significantly below the full channel duration $N_h$, and also using coset representation of each symbol index $a_{[n]} \in \{0 \ldots A-1\}$. That is, given a set partitioning of the symbol constellation, the state space represents only the coset index $I_{cs}=a_{[n]}\% N_C$ instead of full symbol index $a_{[n]}$. In this case the coset index $I_{cs}$ refers to least significant bits (LSBs) of the symbol index which are protected by the Trellis, while the parallel transitions corresponding to MSBs are not protected by the trellis. To map the symbol coset index $I_{cs}$ and parallel transition index $I_{ms}$ index we use the known mapping functions $\mu(I_{cs},I_{ms})$ that use set partitioning.

Viterbi State Space:

In an example implementation in which the RSSE circuit 218 uses the Viterbi algorithm, the RSSE circuit 218 maintains a set of states that corresponds to all possible symbols coset sequences of length $N_t-1$. In an example implementation, such as described above, the length of the sequences may be $N_t-1=5$. Every Viterbi state represents an infinite set of symbol vectors. Such that symbol vectors are partitioned according to the LSBs (cosets) of their latest $N_t-1$ symbols. For example, at symbol n, the symbol indices sequence $\{a_{[n-k]}\}_{k=0}^{\infty}$ is represented by the following coset sequence $$s_{[n]}=\{a_{[n]}\%N_c, a_{[n-1]}\%N_c, a_{[n-2]}\%N_c, a_{[n-2]}\%N_c, \ldots, a_{[n-N_t+1]}\%N_c\}, \quad (1)$$

where % denotes modulo, and $N_C$ is the number of cosets (which may also vary according to delay, i.e. by $N_{c_{[k]}}$). If the RSSE circuit 218 looks far enough into the past ($k \to \infty$), there are infinitely many symbol sequences represented by the same small (in our example of size $N_t-1=5$) coset vector.

For each state $0 \leq m \leq 4^{N_t-1}-1$ (representing a short coset vector), the Viterbi memory of RSSE circuit 218 holds an accumulated metric of the state M; a history of $N_h$ symbols $a[n], a_{[n-1]}, \ldots a_{[n-N_h+1]}$; and a last phase estimation $\theta_{[n]}$.

Hybrid M-Viterbi State Space

In an example implementation in which the RSSE circuit 218 uses the M-Viterbi algorithm, up to $M_{tail}$ different tails may be held for each Viterbi state. For each tail, the RSSE circuit 218 may keep and maintain: an accumulated metric of the state M; a history of $N_h$ symbols $a_{[n]}, a_{[n-1]}, \ldots, a_{[n-N_h+1]}$; and a last phase estimation $\theta_{[n]}$. The RSSE circuit 218 may alternatively maintain a partial symbol history, e.g. $a[n-D], a_{[n-D-1]}, \ldots a_{[n-N_h+1]}$, where D>0, in which case $a_{[n]}, a_{[n-D+1]}$ may be determined from the input data when extending the survivor (e.g. using multi-dimensional slicing).

Unlike the Viterbi algorithm, the M-Viterbi algorithm may experience duplicate tails (as does the M-Algorithm) per Viterbi state. Thus, the M-Viterbi algorithm requires a mechanism for pruning these duplicate tails for the same Viterbi state. Duplicate tails correspond to identical symbol history $a[n], a_{[n-1]}, \ldots a_{[n-N_h+1]}$. When the RSSE circuit 218 detects duplicate tails, the tail(s) having worse metric (i.e. higher numerical value) may be discarded. This process may occur far slower than symbol rate, which is beneficial for complexity reduction.

Thus, whereas the Viterbi algorithm maintains a single previous Viterbi state for each current state, the M-Viterbi algorithm holds M different possible previous states for each current state. The tails captures state history that would be too old to be captured by a Viterbi trellis (i.e., the M-Viterbi captures state history that is longer than Viterbi memory). The tails of the M-Viterbi algorithm efficiently describe a small subset of the possible long survivors, whereas the Viterbi trellis describes all possible short survivors and the M algorithm holds only M paths that do not include all possible short paths. Since short paths only contain information about most recent symbols (which is least reliable) the M-Viterbi reduces the probably of losing the correct path, as compared to the M-Algorithm.

Viterbi State Connectivity/Branches

When receiving at time n a new sample [n], the RSSE 218 may update all the Viterbi states from time corresponding to symbol n−1 to time corresponding to symbol n. For each possible state $s_{[n]}$ at time n, the RSSE circuit 218 examines all possible prior states $s_{[n-1]}$ at time n−1 from which $s_{[n]}$ could have possibly originated. In an example implementation, the set of prior states for $s_{[n-1]}$ is:

$$s_{[n-1]}=\{a_{[n-1]}\%N_c, a_{[n-2]}\%N_c, a_{[n-3]}\%N_c \ldots a_{[n-N_t]}\%N_c\}. \quad (2)$$

Note that $a_{[n-1]}\% N_c, a_{[n-2]}\% N_c, \ldots, a_{[n-N_t+1]}\% N_c$ are common to $s_{[n]}$ and $S_{[n-1]}$ and therefore don't require any algorithm decision. Basically these correspond to the narrowing of the set of possible prior states from which each particular $s_{[n]}$ may have originated. The different options for the oldest coset $a_{[n-N_t]}\% N_c$ complete the $s_{[n-1]}$ definition. Since coset $a_{[n-N_t]}\% N_c$ is not defined by $s_{[n]}$, there are $N_c$ different possible prior states (possible values of $s_{[n-1]}$). Each such directed pair of states $s_{[n-1]} \to s_{[n]}$, where $s_{[n-1]}$ is the prior state and $s_{[n]}$ is a branch.

M-Viterbi State Additional Connectivity

In the M-Viterbi approach the RSSE circuit 218 considers, per such prior state $s_{[n-1]}$, all the $M_{tails}$ possible tails. Each such tail is a possible sequence of symbol indices that ended in that state $s_{[n-1]}$ (i.e. a survivor). Thus, per $s_{[n]}$ state, we get $M_{tails} \cdot N_c$ survivors that are candidates that may have preceded that $s_{[n]}$ state. We denote each survivor at time n−1 as the pair $(s[n-1], m)$, where $s[n-1]$ is the prior state and $m=1, 2, \ldots, M_{tails}$ is a tail associated with that prior state. An extended branch $I_{ebr}$ can then be defined as the directed pair of $(s[n-1], m) \to s[n]$ that associates with the new $s[n]$ state, with possible prior survivor tail, belonging to the $s[n-1]$ state.

Parallel Transitions (MSBs)

Similarly, the MSBs of the newest symbol $a_{[n]}$ (i.e. floor $(a_{[n]}/N_c)$), are not defined by $s_{[n]}$. Therefore for each state $$S_{[n-1]}=\{a_{[n-1]}\%N_c, a_{[n-2]}\%N_c, a_{[n-3]}\%N_c \ldots a_{[n-N_t]}\%N_c\} \quad (3)$$

(and in the M-Viterbi, for each of s[n−1] constituent tails m=1, 2, . . . , M), we have several options for the value of the MSBs (floor($a_{[n]}/N_c$) options, to be exact). These different options the values of MSBs do not amount to different branches, since the same set of MSBs may correspond to any branch $s_{[n-1]} \rightarrow s_{[n]}$. Instead, these different options are parallel transitions. In a conventional Viterbi decoder, the parallel transitions (i.e. $a_{[n]}$ MSBs) are based on $y_{[n]}$ and protected only by the decoder having determined these cosets. In contrast, in an example implementation of this disclosure, the RSSE circuit 218 protects the MSBs selection based on [n], $y_{[n-1]}$, and their cosets. In another example implementation of this disclosure, the RSSE circuit 218 first decodes the cosets, and then runs the Viterbi Algorithm or the Hybrid M-Viterbi again to decode the MSBs. In this second run, the cosets (LSBs) are fixed (to their decoded result from first run) thus allowing the RSSE circuit 218 to handle the MSBs.

(Coset) Viterbi Update

Every symbol time n, an example implementation of the RSSE circuit 218 using the Viterbi algorithm updates the metric for each state $s_{[n]}$ based on the incoming branches ($I_{br}$) and new received sample $y_{[n]}$. The metric of each branch is minimized over possible parallel transitions ($I_{ms}$), and is then used to compute the following state $s_{new}$ metric $$M(s_{new}) = \operatorname{argmin}_{I_{br} \in B(s_{new})} \operatorname{argmin}_{I_{ms}} \|y_{[n]} - \zeta(s_{new}, s_{root}(I_{br}), I_{ms})\|^2 + M(s_{old}(I_{br})) \quad (4)$$

where $B(s_{new})$ is the set of $N_c$ possible incoming branches $s_{root[k]} \rightarrow s_{new}$ to the state $s_{new}$; $I_{br}$ is a branch index; there are $N_c$ possible incoming branches for $s_{new}$; and $s_{root}(I_{br})$ is the root states of the branch $I_{br}$, which includes all the recent state history $\{a_{[n-k]}\}_{k=D}^{N_h}$ that is relevant for computing metric ("filter memory" and phase), D>0 where it is desired to maintain partial symbol history as explained above; $I_{ms}$ is a parallel transitions index, of which there are $A/N_c$ possibilities; and $\zeta(s_{old}(I_{br}), I_{br}, I_{ms})$ is a predictor for $y_{[n]}$ based on $s_{new}, s_{old}(I_{br})$, $I_{ms}$.

Thus the state metric for state $s_{[n]}$ is taken as the minimum of a set of different branches $I_{br} \in B(s_{[n]})$, at the same time the RSSE circuit 218 stores the selected branch (providing the minimal metric in the formula above). The index of selected branch is stored in traceback memory of the RSSE circuit 218 that indicates for each state $s_{[n]}$ the selected root state $s_{[n-1]}$ (i.e. selected branch) and also the transmitted symbol $a_{[n]}$ associated with the transition to terminal state $s_{[n]}$. Note that the state index itself implies the coset $a_{[n]}\% N_c$ (i.e. the LSBs). Thus, the RSSE circuit 218 may only incrementally store the MSBs per state. Also note that traceback memory may not hold traceback data relating to very old information that exceeds the traceback depth discussed below. Thus, the traceback memory may be implemented as a cyclic buffer of depth at least as big as the traceback depth.

M-Viterbi Update

Every symbol time n, an example implementation of the RSSE circuit 218 using the M-Viterbi algorithm computes a set of $M_{tails}$ tails for each state s[n] based on the incoming $N_c \cdot M_{tails}$ extended branches ($I_{ebr}$), and based on received sample $y_{[n]}$. For each new state $s_{[n]}$, there are $N_c$ prior states $\{_{[n-1]}\}$ and for each such prior state there are $M_{tails}$ possible tails that correspond to different symbol histories. Thus, in total there are $N_c \cdot M_{tails}$ candidate (state, tails) pairs that may have preceded that new state. From this set the RSEE circuit 218 using the M-Viterbi algorithm selects a subset of candidates consisting of the best (e.g., having the smallest metrics) $M_{tails}$ candidates.

For each extended branch $I_{ebr}$ the conditional expectation of $y_{[n]}$ is based on recent symbols history from the root state $S_{root}(i_{ebr})$ and slightly less recent symbol history corresponding tail hanging from $s_{root}(i_{ebr})$ denoted tail($I_{ebr}$). To avoid excess notation, it is assumed in this disclosure that tail($I_{ebr}$) contains all the history, since for each tail there is only one root state. Thus the conditional expectation function is denoted $\zeta_{tl}(s_{term}(I_{ebr}), \text{tail}(I_{ebr}), I_{ms})$.

The metric of each extended branch ($I_{ebr}$) is minimized over possible parallel transitions ($I_{ms}$), and is used to compute the following state metric:

$$M(I_{ebr}) = \operatorname{argmin}_{I_{ms}} \|y_{[n]} - \zeta\zeta_{tl}(s_{new}(I_{ebr}), \text{tail}(I_{ebr}), I_{ms})\|^2 + M(s_{old}(I_{br})) \quad (5)$$

where $I_{ebr}$ is an extended branch index, and there are $N_c \cdot M_{tails}$ possible incoming branches for $S_{new}$; tail($I_{ebr}$) includes the prior tail of the branch $I_{ebr}$, which includes all the recent state history $\{a_{[n-k]}\}_{k=D}^{N_h}$ that is relevant for computing metric ("filter memory" and phase); D>0 if it is desired to maintain partial symbol history as explained above; $I_{ms}$ is a parallel transitions indicator, and there are $A/N_c$ possible parallel transitions; and $\zeta_{tl}(s_{new}, \tau, I_{ms})$ is the conditional expectation for $y_{[n]}$ based on state $S_{new}$, tail $\tau$, and $I_{ms}$.

Using this formula, an example implementation of the RSSE circuit 218 using the M-Viterbi algorithm computes $N_c \cdot M_{tails}$ metrics ($I_{ebr}$), and choses the $M_{tails}$ tails yielding the smaller (i.e., better) aggregate state metrics as the appropriate survivors for the new $s_{[n]}$ state. At the same time, for each $s_{[n]}$ tail, the RSSE 218 may store the selected extended branch $I_{ebr}$ (providing the minimal metric for the respective $s_{[n]}$ tail). The index of selected extended branch is stored in the traceback memory of the RSSE circuit 218 that indicates, for each pair (state $s_{[n]}$, tail), the selected incoming prior state $s_{[n-1]}$ and tail (i.e. selected extended branch) and also the hypothesized transmitted symbol $a_{[n]}$ at that state $s_{[n]}$. The state index itself implies the coset $a_{[n]}\% N_c$ (i.e. the LSBs). Thus, the RSSE circuit 218 may only incrementally store the MSBs per state. Also the traceback memory may not hold traceback data relating to very old information that exceeds the traceback depth discussed below. Thus, the traceback memory may be implemented as a cyclic buffer of depth at least as big as the traceback depth.

Viterbi Traceback

Having updated the state metric for every state in symbol time n, an example implementation of the RSSE circuit 218 implementing the Viterbi algorithm may apply traceback to decode/estimate the transmitted symbols. The traceback depth may indicate the delay of the symbol to be decode with respect to the latest state from which the processing starts (i.e. $s_{[n]}$). This may be, for example, at least 5-10 times the pulse memory, including channel induced ISI. The traceback may be implemented every symbol or every several symbols to reduce complexity.

An example Viterbi traceback operation will now be described. Just after updating all metrics of state set $\{s_{[n]}\}$ the RSSE circuit 218 implementing the Viterbi algorithm finds the best state $s_{[n]}$ based on the aggregate state metrics. Then, using the traceback memory, the RSSE circuit 218 implementing the Viterbi algorithm finds the best prior state for $s_{[n]}$ (denoted $s_{[n-1]}$). This process repeats until reaching the traceback depth (i.e. using the traceback the RSSE circuit 218 implementing the Viterbi algorithm finds for $s_{[n-k]}$ the best prior state $S_{[n-k-1]}$ until $k = N_{tb\_depth} - 1$). Finally, the traceback process returns the transmission symbol or soft information (e.g., LLRs) attached to $$s_{[n-N_{tb\_depth}]}$$

in the traceback memory (i.e. the decoded data).

M-Viterbi Traceback

The traceback in an example implementation of the RSSE circuit 218 implementing the M-Viterbi is similar to as described above when implementing the Viterbi algorithm. For the M-Viterbi algorithm, however, the tails need to be considered in addition to the states.

An example M-Viterbi traceback operation will now be described. Just after updating all metrics of state set $\{s_{[n]}\}$, the RSSE circuit 218 finds the best pair of state and tail (denoted $(s_{[n]}, m_{[n]})$). Then, using the traceback memory the RSSE circuit 218 finds the best prior pair of state and tail denoted $(s_{[n-1]}, m_{[n-1]})$. The process repeats until reaching the traceback depth (i.e. using the traceback the RSSE circuit 218 finds, for $(s_{[n-k]}, m_{[n-k]})$, the best prior pair $(s_{[n-k-1]}, m_{[n-k-1]})$, until $k=N_{tb\_depth}-1$. Finally the traceback process returns the transmission symbol or soft information (i.e., LLRs) attached to $$\left(s_{[n-N_{tb\_depth}]}, m_{[n-N_{tb\_depth}]}\right)$$

in the traceback memory (i.e. the decoded data).

Viterbi Metric Minimization Process

At the input to the Viterbi algorithm (output of mixer 216) $y_{[n]}$ can be modeled as $$\hat{y}_{[n]} = e^{j\theta[n]} \cdot h_{pc} * f_{NL}(\Sigma_{k=0}^{N_h} h_{[k]} \cdot a_{[n-k]}), \quad (6)$$

where $a_{[n-k]}$ are the previously transmitted symbols; $h_{[\;]}$ is the transmit pulse response; $h_{pc_{[\;]}}$ is the post-cursor ISI that the RSSE circuit 218 implementing the Viterbi algorithm attempts to cancel, where * stands for convolution; $e^{j\theta[n]}$ is the phase rotation due to phase noise; and $f_{NL}(\;)$ is a non-linear function that models the power amplifier (PA) of the transmitter from which the signal was received (e.g., PA 116 when receiving from transmitter 100). Thus the appropriate branch metric for the Viterbi Algorithm is $$M_{br}(s_{new}, s_{old}, I_{ms}) = |y_{[n]} - \zeta(s_{new}, s_{old}, I_{ms})= \quad (7)$$

$$= |y_{[n]} - e^{j\theta[n]} \cdot h_{pc} * f_{NL}(\Sigma_{k=0}^{N_h} h_{[k]} \cdot a_{[n-k]})|^2 = \quad (8)$$

$$= |y_{[n]} - e^{j \cdot s_{old} \cdot \theta} \cdot \Sigma_{l=0}^{N_{pc}} h_{pc[l]} \cdot f_{NL}(h_{[0]} \cdot \mu(S_{new}, I_{cs}, I_{ms}) + \Sigma_{k=1}^{N_h} h_{[k]} \cdot s_{old} \cdot a_{[n-l-k]})|^2 \quad (9)$$

where $S_{new}$ is the target state for which the RSSE circuit 218 is computing the metric; $s_{old}$ is the designated prior state for $S_{new}$; $S_{new} \cdot I_{cs}$ is the coset value that applies (in a fixed way) to the new state $s_{new}$; and $s_{old} \cdot a_{[n-k]}$ are the sequence of symbols stored in the prior state $s_{old}$ history for $k \leq N_h$; $h_{[\;]}$ is the transmit pulse response; $h_{pc_{[\;]}}$ is the post cursor ISI the RSSE circuit 218 implementing the Viterbi algorithm attempts to cancel, where * stands for convolution; $N_{pc}$ is the length of the post cursor ISI, $h_{pc}$, that the RSSE circuit 218 implementing the Viterbi algorithm attempts to cancel, assuming that $h_{pc}[0]=1$ is the FFE/DFE cursor; $S_{old,\theta}$ is the latest phase hypothesis for the prior state $s_{old}$; $\mu(I_{cs}, I_{ms})$ is a term that, given coset index and msb selection index, computes symbol value; and $I_{ms}$ the hypothesized MSB bits for $a_{[n]}$.

M-Viterbi Metric Minimization Process

Similarly the appropriate branch metric for the Hybrid M-Viterbi is $$M_{br}(s_{new}, s_{old}, I_{ms}) = |y_{[n]} - \zeta_{tl}(s, \tau, I_{ms})|^2 = \quad (10)$$

$$= |y_{[n]} - e^{j \cdot \tau\theta} \cdot \Sigma_{l=0}^{N_{pc}} h_{pc[l]} \cdot f_{NL}(h_{[0]} \cdot \mu(s, I_{cs}, I_{ms}) + \Sigma_{k=1}^{N_h} h_{[k]} \cdot \tau \cdot a_{[n-l-k]})|^2 \quad (11)$$

where $\tau$ is a tail corresponding to a prior state of s, $\tau \cdot a_{[n-k]}$ is symbol history of that tail, $\tau_\theta$ is a phase estimate of that tail;

Thus, the M-Viterbi metric is similar to Viterbi metric except for substituting the prior state data $s_{old} \cdot a_{[n-k]}, s_{old,\theta}$, by the prior tail data $\tau \cdot a_{[n-k]}, \tau_\theta$. The same substitution can be used in above expressions that are written in terms of state $s_{old}$ instead of tail $\tau$.

The branch metric notation can be simplified, and complexity reduced, by denoting the previous PA output estimations as $y_{PA}[n]$. These estimations may be held in memory as part of state $s_{old}$ or tail $\tau$ history to avoid any need to re-compute them.

$$M_{br}(S_{new}, s_{old}, I_{ms}) = |y_{[n]} - e^{j \cdot s_{old} \cdot \theta}(f_{NL}(h_{[0]} \cdot \mu(S_{new}, I_{cs}, I_{ms}) + \Sigma_{k=1}^{N_h} h_{[k]} \cdot s_{old} \cdot a_{[n-k]}) + \Sigma_{l=1}^{N_{pc}} h_{pc}[l] \cdot y_{PA[n-1]})|^2 \quad (12)$$

Based on the branch metric of (12) above, the expectation can be written as shown in (13):

$$\zeta(s_{new}, s_{old}, I_{ms}) = e^{j \cdot s_{old} \cdot \theta}(f_{NL}(h_{[0]} \cdot \mu(S_{new}, I_{cs}, I_{ms}) + \Sigma_{k=1}^{N_h} h_{[k]} \cdot s_{old} \cdot a_{[n-k]}) + \Sigma_{l=1}^{N_{pc}} h_{pc}[l] \cdot y_{NLPA}[n-l]) \quad (13)$$

Parallel Transitions:

As explained previously, to update the state $s_{new}$ metric, the RSSE circuit 218 implementing the Viterbi algorithm may attempt to minimize every branch $I_{br}$ metric over all possible parallel transitions $I_{ms}$.

$$M(s_{new}, I_{br}) = \operatorname{argmin}_{I_{ms}} \|y_{[n]} - \zeta(s_{new}, s_{old}(I_{br}), I_{ms})\|^2 + M(s_{old}(I_{br})) \quad (14)$$

Similarly, the RSSE circuit 218 implementing the M-Viterbi algorithm may attempt to minimize the extended branch metric over all possible parallel transitions $I_{ms}$ $$M(I_{ebr}) = \operatorname{argmin}_{I_{ms}} \|y_{[n]} - \zeta_{tl}(s_{new}(I_{ebr}), tail(I_{ebr}), I_{ms})\|^2 + M(s_{old}(I_{br})) \quad (15)$$

In both cases, the RSSE circuit 218 may attempt to minimize a metric over all possible different MSB's (parallel transitions) indexed by $I_{ms}$. In one embodiment, the metrics are computed per state $s_{[n]}$ for every $I_{ms}$ and then the minimum is computed. However this embodiment has significant computational complexity (A/N$_c$).

In another embodiment, in order to reduce complexity, some of the MSBs are determined directly (i.e. by slicing) without the need to compute a metric for each MSB combination. For example, every state $s_{[n]}$ implies a coset for the new symbol $a_{[n]}$, and thus determines the new symbol LSBs. In this manner, the RSSE circuit 218 determines a coset value for the LSBs. With the coset determined, the RSSE circuit 218 may slice the MSBs and compute the metric corresponding to the resulting (sliced) $a_{[n]}$.

For example if the mapper 106 performs integer mapping of the 4 cosets and of the MSB indices, i.e.

$$\mu(I_{cs}, I_{ms}) = 2 \cdot I_{cs} + 4 \cdot I_{ms} - \sqrt{A} + 1 \quad (16)$$

where A is the number of points for the square constellation. Then $$I_{ms} = \operatorname{round}\left(\frac{f_{NL}^{-1}\left(\frac{y_{[n]}}{e^{j \cdot s_{old} \cdot \theta}} - \sum_{l=1}^{N_{pc}} h_{pc}[l] \cdot y_{NL}(n-l)\right) - \sum_{k=1}^{N_h} h_{[k]} \cdot s_{old} \cdot a_{[n-k]}}{4 \cdot h_{[0]}} - \frac{2 \cdot I_{cs} - \sqrt{A} + 1}{4}\right) \quad (17)$$

In a similar way, in another example implementation, the RSSE circuit 218 may test 4 hypotheses for the LSB of the parallel transitions $I_{ms}$ for each branch (extended branch) and corresponding coset $I_{cs}$, and, for each such branch (extended branch) and each such hypothesis, slice the rest of the MSBs. Finally, The RSSE circuit 218 may select from the hypothesized parallel transitions $I_{ms}$ for a given coset $I_{cs}$ and branch (extended branch), the parallel transition having the lowest metric. The down side of slicing parallel transition MSBs is the need to invert the non-linearity, which may increase noise. However the metric computation to be minimized (i.e. $M(s_{new}, I_{br})$ or $M(I_{ebr})$) does not involve $f_{NL}^{-1}$ and therefore does not increase noise. Thus, as the number of hypotheses of $I_{ms}$ LSBs taken prior to minimizing over all hypothesis per coset per branch metric increases, the probability of error decreases due to complexity reduction.

In another example implementation, in order to reduce the Viterbi memory by 1 (i.e. from $N_t$ to $N_t-1$) the RSSE circuit 218 may use $y_{[n]}$ and $y_{[n-1]}$ to compute parallel transitions for $a_{[n-1]}$. In this case it may be desirable to account for $y_{[n]}$ being affected by both $a_{[n-1]}$ and $a_{[n]}$. Thus the RSSE circuit 218 recovers $a_{[n]}$ only tentatively to improve slicing of $a_{[n-1]}$ msb's. In this case the RSSE circuit 218 may use several compound hypothesis (e.g. $N_c \cdot N_c$) that include both $a_{[n-1]}$ lsb's and $a_{[n]}$ lsb's. For each such compound hypothesis, the RSSE circuit 218 may slice msb's of both $a_{[n-1]}$ and $a_{[n]}$ in order to get a robust estimation of $a_{[n-1]}$. For each compound hypothesis, the RSSE circuit 218 may compute a metric, and finally select per $a_{[n-1]}$ coset the $a_{[n-1]}$ msb's having best (i.e. lowest) metric.

It should be noted that in order to reduce complexity for relatively flat channel the RSSE circuit 218 may convolve the post cursor response with the composite filter $h_{[\ ]}$ and use the trivial post cursor response $h_{pc_{[\ ]}} = [1,0,0, \ldots 0]$. In such an implementation, the channel response in the above equations may be rewritten as $h_{[\ ]} = \Sigma_{l=1}^{N_{pc}} h_{pc}[l] \cdot p[n-l]$.

In FIGS. 1 and 2, busses/data lines labeled with an 'X' operate at the baud rate.

Figure 3:
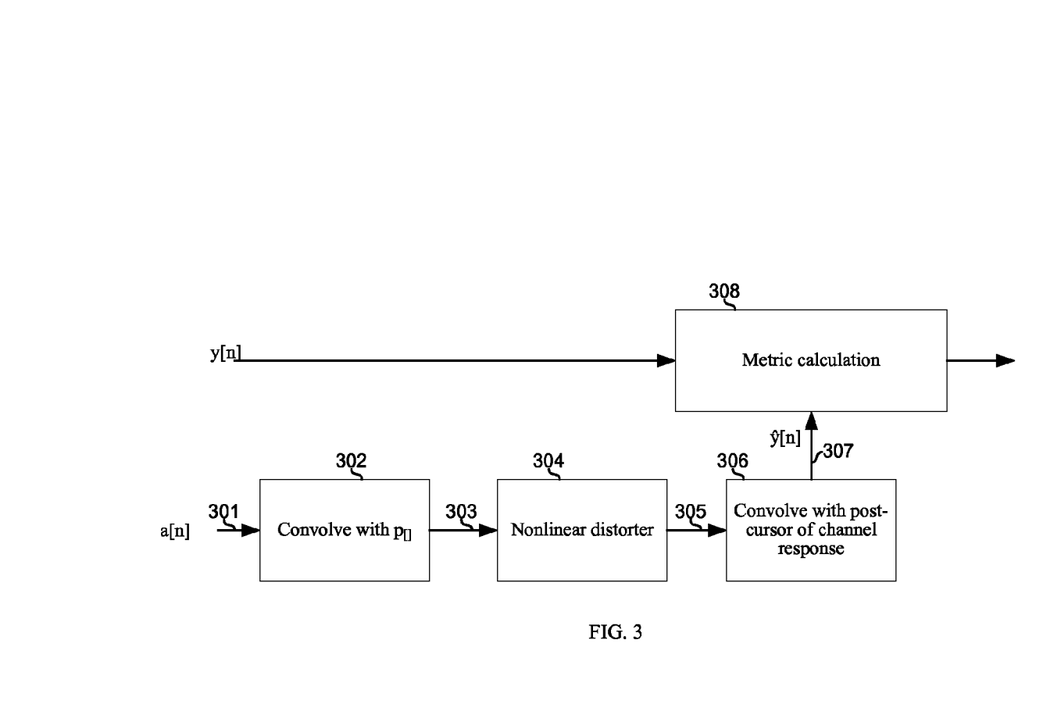
FIG. 3 depicts an example Viterbi implementation of the sequence estimation circuitry of FIG. 2.

FIG. 3 depicts an example Viterbi implementation of the sequence estimation circuitry of FIG. 2. In FIG. 3, the circuitry 302 convolves the expectancy $\zeta(s_{new}, s_{old}, I_{ms})$ with the response of shaping filter 108 (FIG. 1) to output signal 303. The circuitry 304 distorts the signal 303 based on a model of the nonlinear distortion present in the signal $y_{[n]}$. The result of the distortion is signal 305. The circuitry 306 convolves the signal 305 with the post-cursor portion of the channel response to generate signal 307, which is an estimation of the signal $y_{[n]}$ given the expectancy $\zeta(s_{new}, s_{old}, I_{ms})$.

In accordance with an example implementation of this disclosure, an electronic receiver (e.g., 200) comprises front-end circuitry (e.g., 202, 204, 206, 210, 212, 214, and/or 216) and sequence estimation circuitry (e.g., 218). The front-end circuitry is operable to receive a signal over a communication channel, where the received signal is a result of a sequence of symbols being transmitted by a transmitter (e.g., 100). The sequence estimation circuitry is operable to implement a sequence estimation algorithm. In the sequence estimation algorithm, each of a plurality of possible current states of the signal may have associated with it a respective $N_c$ possible prior states and a respective M state extensions, where $N_c$ and M are integers greater than 1. Each iteration of the sequence estimation algorithm may comprise extending each of the plurality of possible current states of the signal by its respective $N_c$ possible prior states and its respective M state extensions to generate a respective $N_c \times M$ extended states for each of the plurality of possible current states. Each iteration of the sequence estimation algorithm may comprise, for each of the plurality of possible current states of the signal, selecting M of the respective $N_c \times M$ extended states to be state extensions for a next iteration of the sequence estimation algorithm. The quantity of states in the plurality of possible states may be less than the full Viterbi state count. Each of the plurality of possible states may correspond to a sequence of cosets of the symbol constellation QAM used to generate the symbol sequence. The cosets may correspond to one or more least significant bits of a symbol. The sequence estimation circuitry may be operable to, after determination of the least significant bits based on the plurality of metrics, determine most significant bits of the symbol using slicing. The sequence estimation circuitry may be operable to, after determination of the least significant bits based on the plurality of metrics, determine most significant bits of the symbol using a second iteration of the sequence estimation algorithm in which the determined least significant bits are held fixed. The sequence estimation circuitry may be operable to determine a first one or more most significant bits of the symbol using slicing and a second one or more most significant bits of the symbol using a second iteration of the sequence estimation algorithm in which previously determined least significant bits are held fixed. The state extensions may correspond to previous state information that is older than previous state information represented by the plurality of the possible states. The sequence estimation circuitry may be operable to sort the plurality of extended states for each of the plurality of possible states, where the sort is based on the plurality of metrics.

In accordance with an example implementation of this disclosure, an electronic receiver (e.g., 200) comprises front-end circuitry (e.g., 202, 204, 206, 210, 212, 214, and/or 216) and sequence estimation circuitry (e.g., 218). The front-end circuitry is operable to receive a signal over a communication channel, where the received signal is a result of a sequence of symbols being transmitted by a transmitter (e.g., 100). The sequence estimation circuitry is operable to implement a sequence estimation algorithm. The sequence estimation algorithm may comprise, at symbol time n−1 (an arbitrary symbol time): extending a particular possible state of the signal by $N_c$ possible prior states for the particular possible state, resulting in $N_c$ extended states; extending each of the $N_c$ extended states using their extension tails, resulting in $N_c \times M$ first extended states with tails; and selecting M of the $N_c \times M$ extended states with tails as second state extension tails for the particular possible state. The sequence estimation algorithm may comprise, at symbol time n (the symbol time following the symbol time n−1): generating second extended states with tails using the M second state extension tails.

The present method and/or system may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A system comprising:
   an electronic receiver comprising:
      front-end circuitry operable to receive a signal over a communication channel, wherein said received signal is a result of a sequence of symbols being transmitted by a transmitter; and
      sequence estimation circuitry operable to implement a sequence estimation algorithm in which:
         each of a plurality of possible current states of said received signal has associated with it a respective $N_c$ possible prior states and a respective M state extensions, where $N_c$ and M are integers greater than 1;
         for each iteration of said sequence estimation algorithm:
            each of said plurality of possible current states of said received signal is extended by its respective $N_c$ possible prior states and its respective M state extensions to generate a respective $N_c \times M$ extended states for each of said plurality of possible current states; and
            for each of said plurality of possible current states of said received signal, M of said respective $N_c \times M$ extended states are selected to be state extensions for a next iteration of said sequence estimation algorithm.

2. The system of claim 1, wherein how many states are in said plurality of possible current states is less than a full Viterbi state count.

3. The system of claim 1, wherein each of said plurality of possible current states corresponds to a sequence of cosets of a symbol constellation used to generate said sequence of symbols.

4. The system of claim 3, wherein a coset of said sequence of cosets corresponds to one or more least significant bits of a symbol.

5. The system of claim 4, wherein said sequence estimation circuitry is operable to, after determination of said least significant bits based on a plurality of metrics, determine most significant bits of said symbol using slicing.

6. The system of claim 4, wherein said sequence estimation circuitry is operable to, after determination of said least significant bits based on a plurality of metrics, determine most significant bits of said symbol using a second iteration of said sequence estimation algorithm in which said determined least significant bits are held fixed.

7. The system of claim 4, wherein said sequence estimation circuitry is operable to determine a first one or more most significant bits of said symbol using slicing and a second one or more most significant bits of said symbol using a second iteration of said sequence estimation algorithm in which previously determined least significant bits are held fixed.

8. The system of claim 1, wherein said state extensions correspond to prior state information that is older than prior state information represented by said $N_c$ possible prior states.

9. The system of claim 1, wherein said sequence estimation circuitry is operable to sort said $N_c \times M$ extended states for each of said plurality of possible current states.

10. A method comprising:
    in an electronic receiver:
       receiving, via front-end circuitry of said electronic receiver, a signal over a communication channel, wherein said received signal is a result of a sequence of symbols being transmitted by a transmitter; and
       demodulating, in sequence estimation circuitry of said electronic receiver, said received signal using a sequence estimation algorithm in which:
          each of a plurality of possible current states of said received signal has associated with it a respective $N_c$ possible prior states and a respective M state extensions, where $N_c$ and M are integers greater than 1; and
          each iteration comprises:
             extending each of said plurality of possible current states of said received signal by its respective $N_c$ possible prior states and its respective M state extensions to generate a respective $N_c \times M$ extended states for each of said plurality of possible current states; and
             for each of said plurality of possible current states of said received signal, selecting M of said respective $N_c \times M$ extended states to be state extensions for a next iteration of said sequence estimation algorithm.

11. The method of claim 10, wherein how many states are in said plurality of possible current states is less than a full Viterbi state count.

12. The system of claim 10, wherein each of said plurality of possible current states corresponds to a sequence of cosets of a symbol constellation used to generate said sequence of symbols.

13. The system of claim 12, wherein a coset of said sequence of cosets corresponds to one or more least significant bits of a symbol.

14. The system of claim 13, comprising:
    determining, by said sequence estimation circuitry, said least significant bits based on a plurality of metrics; and
    after said determining said least significant bits, determining, by said sequence estimation circuitry, most significant bits of said symbol using slicing.

15. The system of claim 13, comprising:
    determining, by said sequence estimation circuitry, said least significant bits based on a plurality of metrics; and
    after said determining said least significant bits, determining, by said sequence estimation circuitry, most significant bits of said symbol using a second iteration of said sequence estimation algorithm in which said determined least significant bits are held fixed.

16. The system of claim 13, comprising determining, by said sequence estimation circuit, a first one or more most significant bits of said symbol using slicing and a second one or more most significant bits of said symbol using a second iteration of said sequence estimation algorithm in which previously determined least significant bits are held fixed.

17. The system of claim 10, wherein said state extensions correspond to prior state information that is older than prior state information represented by said $N_c$ possible prior states.

18. The system of claim 10, comprising sorting, by said sequence estimation circuitry, said $N_c \times M$ extended states for each of said plurality of possible current states.

19. A system comprising:
an electronic receiver comprising:
- front-end circuitry operable to receive a signal over a communication channel, wherein said received signal is a result of a sequence of symbols being transmitted by a transmitter; and
- sequence estimation circuitry operable to implement a sequence estimation algorithm in which:
  - at symbol time n−1, a particular possible state of said received signal is extended by $N_c$ possible prior states for said particular possible state, resulting in $N_c$ extended states;
  - at symbol time n−1, each of said $N_c$ extended states is extended by M first state extension tails, resulting in $N_c \times M$ first extended states with tails;
  - at symbol time n−1, M of said $N_c \times M$ extended states with tails are selected as second state extension tails for said particular possible state; and
  - at symbol time n, said M second state extension tails is used for generating second extended states with tails.

\* \* \* \* \*